(12) United States Patent
Rosen

(10) Patent No.: US 9,823,454 B2
(45) Date of Patent: Nov. 21, 2017

(54) PNEUMATIC PARABOLIC MIRROR SOLAR ENERGY COLLECTOR AND GRIDS MADE THEREOF

(71) Applicant: Arthur Ira Rosen, Sainte-Agathe-des-Monts (CA)

(72) Inventor: Arthur Ira Rosen, Sainte-Agathe-des-Monts (CA)

( * ) Notice: Subject to any disclaimer, the term of this patent is extended or adjusted under 35 U.S.C. 154(b) by 219 days.

(21) Appl. No.: 14/720,741

(22) Filed: May 23, 2015

(65) Prior Publication Data
US 2015/0338623 A1    Nov. 26, 2015

Related U.S. Application Data

(60) Provisional application No. 62/001,775, filed on May 22, 2014.

(51) Int. Cl.
| | | |
|---|---|---|
| *G02B 19/00* | (2006.01) | |
| *F24J 2/07* | (2006.01) | |
| *F24J 2/12* | (2006.01) | |
| *F03G 6/06* | (2006.01) | |
| *F01K 5/00* | (2006.01) | |
| G02B 7/183 | (2006.01) | |
| F24J 2/24 | (2006.01) | |
| F24J 2/54 | (2006.01) | |

(52) U.S. Cl.
CPC ............ *G02B 19/0042* (2013.01); *F01K 5/00* (2013.01); *F03G 6/065* (2013.01); *F03G 6/068* (2013.01); *F24J 2/07* (2013.01); *F24J 2/125* (2013.01); *G02B 19/0023* (2013.01); F24J 2/242 (2013.01); F24J 2/54 (2013.01); F24J 2002/5437 (2013.01); G02B 7/183 (2013.01); Y02E 10/41 (2013.01); Y02E 10/42 (2013.01); Y02E 10/46 (2013.01)

(58) Field of Classification Search
CPC .. F01K 5/00; F03G 6/065; F03G 6/068; F24J 2002/5437; F24J 2/07; F24J 2/125; F24J 2/242; F24J 2/54; G02B 19/0023; G02B 19/0042; G02B 7/183; Y02E 10/42
USPC ........................................................ 359/846
See application file for complete search history.

(56) References Cited

U.S. PATENT DOCUMENTS

| | | | | |
|---|---|---|---|---|
| 4,672,389 | A | * 6/1987 | Ulry | ....................... F24J 2/1052 343/880 |
| 2009/0071466 | A1 | * 3/2009 | Penciu | ..................... F03G 6/06 126/684 |
| 2010/0229850 | A1 | * 9/2010 | Sankrithi | .............. F24J 2/1052 126/601 |

(Continued)

*Primary Examiner* — Jennifer L. Doak

(57) ABSTRACT

A scalable parabolic or disc shaped mirror, that is formed and maintained by inflating, with air or inert gas, a rigid polymer membrane envelope, that is pre-formed, and such that when inflated, forms this parabolic or disc shape, governed by a center supporting pole, and ring around circumference of the mirror. The top half of the ballooned envelope is made of a clear transparent membrane through which the sun's rays pass through and on to the lower inner lower surface, which is coated with reflective surface. The balloon is skewered through the middle of each membrane, and clamped with flanges to hermetically seal the envelope. The pole or center structure is anchored and hinged at the base so the Pneumatic Mirror can be articulated to face towards the sun, thus focussing the energy to whatever device is at the focal point.

18 Claims, 6 Drawing Sheets

(56) References Cited

U.S. PATENT DOCUMENTS

Figure 1:
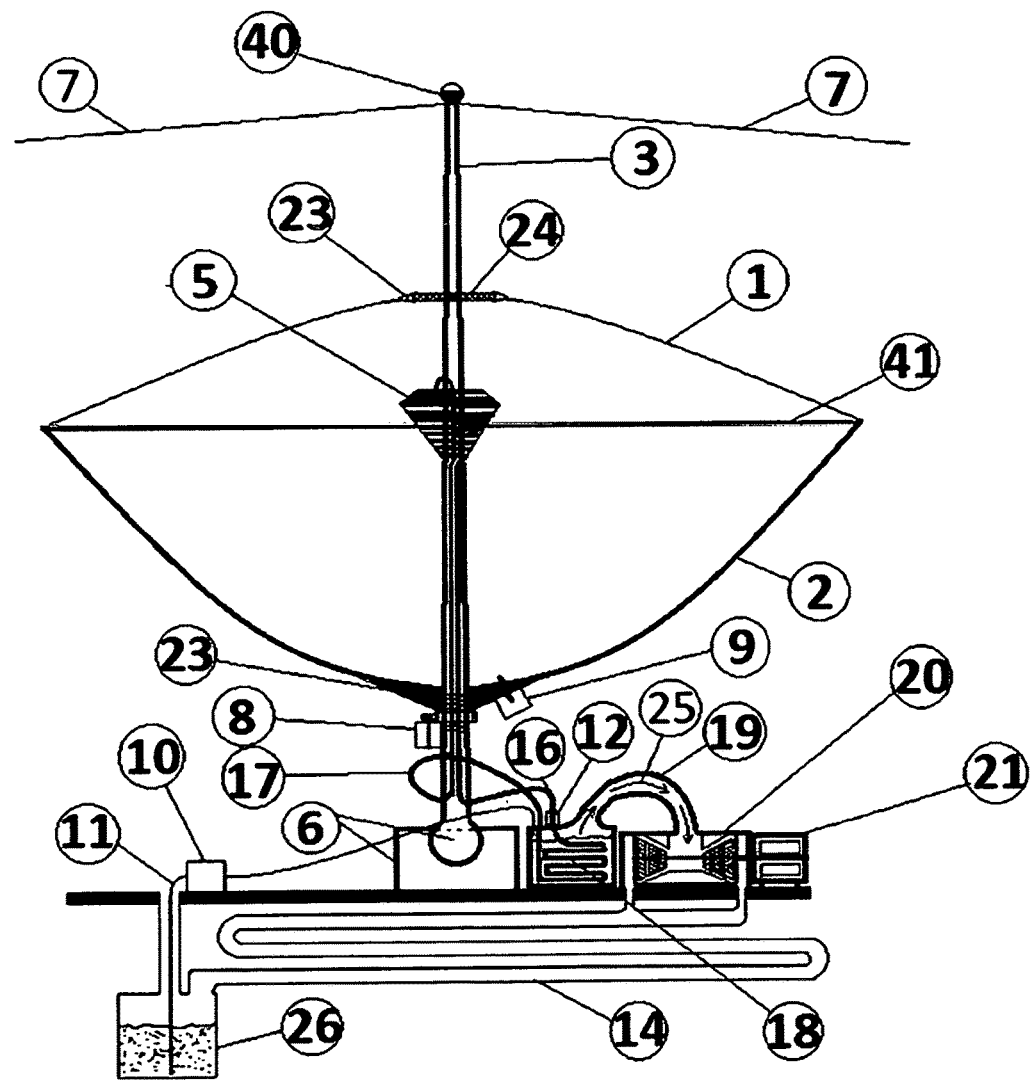

2010/0313880 A1* 12/2010 Shi .............................. F24J 2/12
  126/684
2015/0205095 A1* 7/2015 Hahn .................... G02B 7/183
  359/846

* cited by examiner

PNEUMATIC PARABOLIC MIRROR SOLAR ENERGY COLLECTOR AND GRIDS MADE THEREOF

BACKGROUND

The problem is to devise better ways to produce cheap, clean, energy, in order to reduce the environmental damage being caused by dependence on fossil fuel use, and avoid dangers nuclear fuel use can bring.

The gleaning of energy, physically, from natural forces, to convert into useable force, is a cost effective proposition.

All our energy comes indirectly from the sun, and capturing it the most directly, and with least amount of work and materials, is the logical path, with least amount of impact on our natural world. The sun's energy must be concentrated to be of any use as a utility, and the most effective way is to magnify it by reflecting the rays from a given area to a common focal point. This can best be done by using a parabolic shaped mirror, vertex directed perpendicular to the sun's rays, and securing a heat exchanging device at the focal point, to convert the energy.

The problem is to form a parabolic mirror, large enough, and cheaply enough, to compete economically with other energy producing technologies.

The embodiment of the following Utility patent application was filed as a U.S. Provisional Patent, Application No. 62/001,775, dated May 22, 2014.

SUMMARY

The solution is to inflate a pre-shaped envelope, made from ultra-thin, rigid polymers, to balloon out, and form a parabolic shape.

Modern day polymers, and monomers, like Graphene will enable this solution. The envelope, would have two sections, and thus be bonded. The top half of said envelope, that the sun will shine through, and onto it's inner lower surface, would be of a clear, transparent nature, and dome shaped. The membrane of the bottom section, would be of a pre-formed parabolic shape, and would have an inner surface, that would be coated with a highly efficient, reflective surface.

This inner surface, when the envelope is inflated, would constitute a parabolic reflective mirror, taking on it's pre-formed desired shape, and so that when the finished structure is articulated, vertex facing and y-axis, perpendicular towards the sun, the device can be used to focus the energy from the sun's rays entering, onto whatever might be suspended at the focal point of the parabola.

Two other components are necessary to articulate the parabolic inner surface of the device towards the sun, and maintain the irregular form.

One of these is a rigid ring, to be secured around the circumference of the mirror, inside or out of the envelope, to maintain a stable diameter when pressure is applied.

The other component would be a centre pole, or frame structure, that would skewer both of the bonded membranes of the envelope, at their respective centres, clamped and sealed with flanges to said pole, at determined points. This pole can be substituted by just a cable under tension, in grid formation.

The functional component, the balloon mirror, is so light that a centre structure is only necessary for articulation, to support a heat exchanger, and maintain shape. The envelope is now made hermetically sealed around the pole or cable. They will move as one unit when device is inflated. This centre structure can be the support for different energy exchanging devices. It can be an array PVCs, a water boiler, an Ionic Salt or oil heater, a Gas Turbine, or a Stirling Engine. This centre structure, along with aforementioned rigid ring, is needed to prevent bulging and misshape.

The centre pole can be articulated in different ways as well. Servo-motors attached to the base of the pole could power pan and tilt mechanisms. Also, adjustable cables, anchored at four places around the device, can be secured to the mast of the centre pole as it extrudes from the top: the base being free to swivel by employing a ball and socket joint. The cables anchored and adjusted by servo motors. This second method is easier, more stable, and can be controlled singularly or in grids, all masts linked.

DRAWINGS

FIG. 1: This shows the side view of a working solar energy collector, employing proposed Pneumatic Parabolic Mirror in high noon position.

Oil or Ionic salt is looped up the centre pole through a coil structure at the focal point, to be heated, streamed back down through the pole into a Kettle Coil system to boil water, and then make steam pressure to power attached turbine and electric generator.

Figure 2:
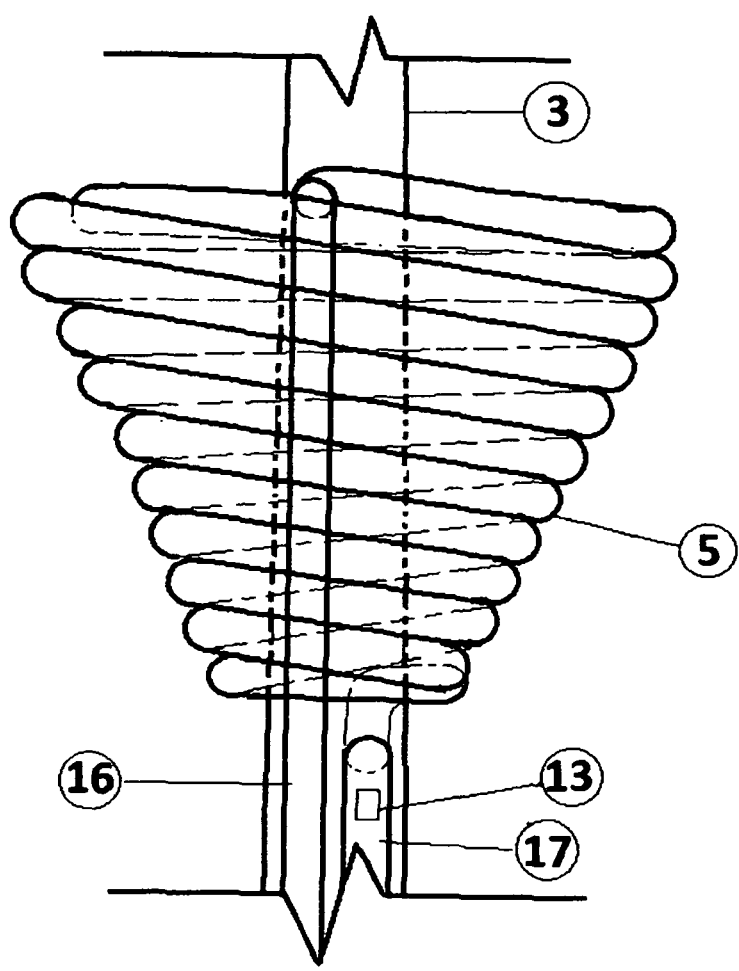

FIG. 2: This is a side view of the coil employed in drawing one to heat the oil or Ionic Salt. It should be encased in a heat absorbing mortar.

Figure 3:
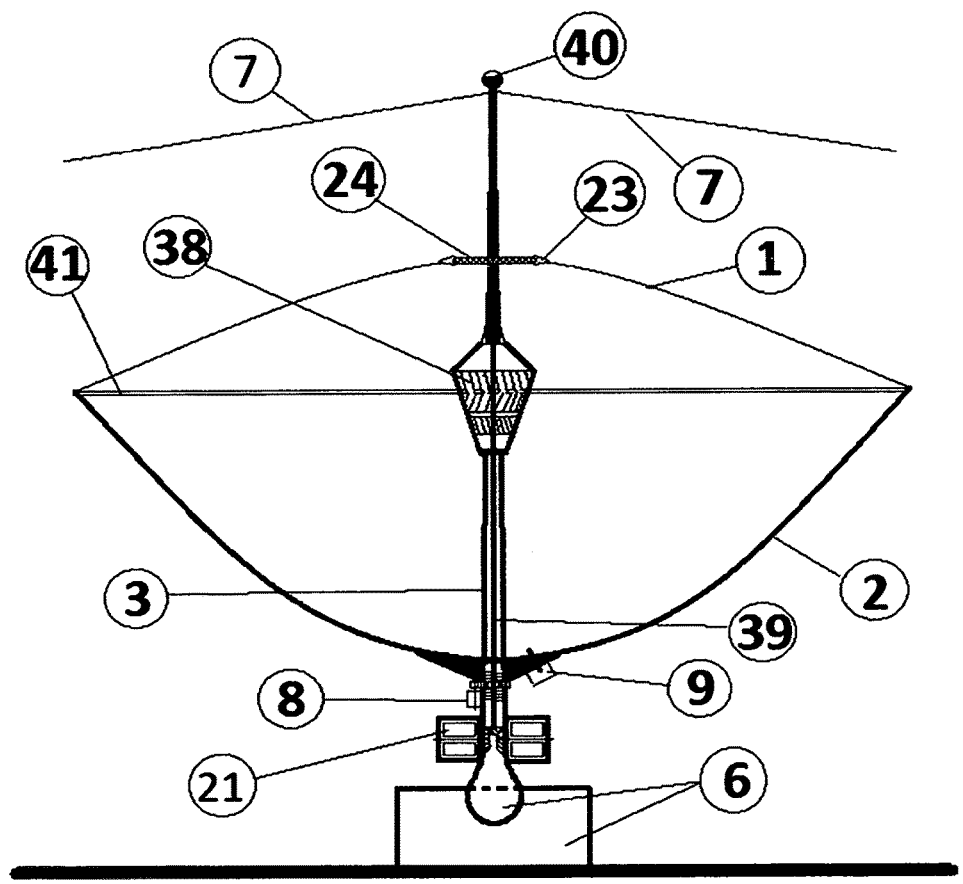

FIG. 3: This is the side view of a working solar energy collector employing proposed Pneumatic Parabolic Mirror. This design would use a gas turbine at the focal point to exchange the heat from the sun's rays.

Figure 4:
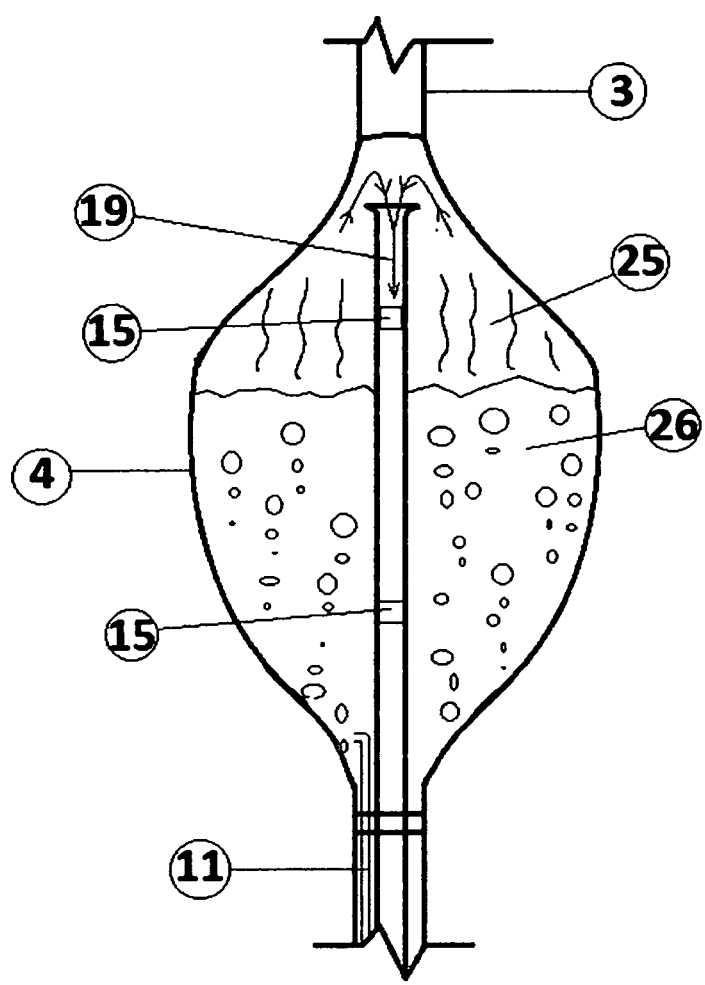

FIG. 4: This is the side view of a water boiler that can be placed at the focal point of this proposed Pneumatic Parabolic Mirror.

Water can be pumped into a chamber, boiled, and the resulting steam and pressure forced down the centre pole to a steam turbine and electric generator. The device can be beneficial without a turbine, but just to desalinate water.

Figure 5:
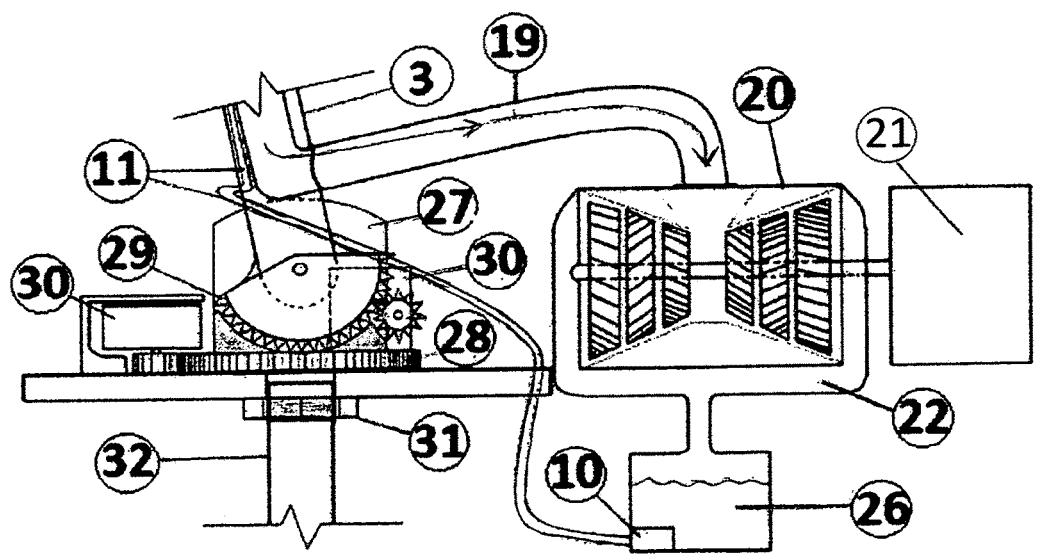

FIG. 5: This is the side view of a pan and tilt mechanism at the base of the centre pole.

It shows how steam can be passed down the centre pole and through the steam turbine end electric generator.

Figure 6:
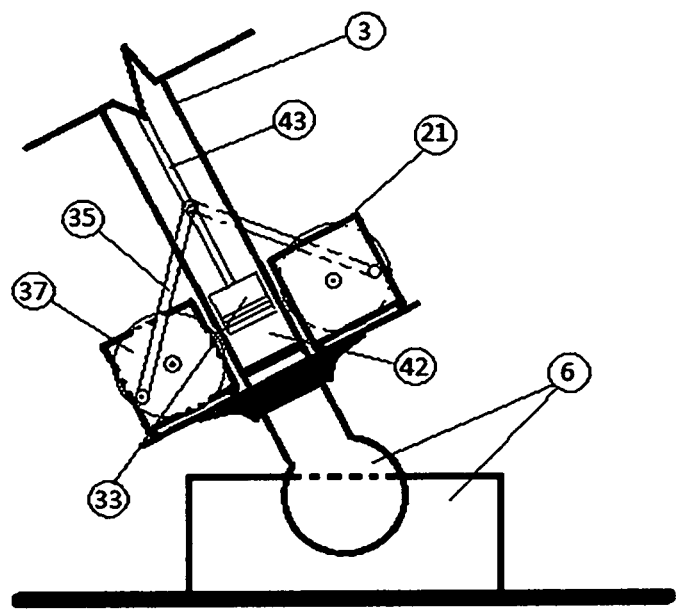

FIG. 6: This is the side view of a way in which the centre pole can house a Stirling Engine.

PREFERRED EMBODIMENT

This inflated envelope method to form and use a parabolic mirror for the purpose of energy collection, once perfected and mass produced, will prove to be the cheapest, least material dependant technology, to harness renewable solar energy, on a large or small scale. Centrally controlled grids of them can produce massive amounts of power for utilities.

It can be deployed in any sunny remote place, quickly and easily, with not too much construction expertise. It can be employed solely to desalinate and purify water, in conjunction with energy production.

It's configuration would lend itself to Military use, farming, mining, disaster relief, at sporting or outdoor events, camping, and battery charging off grid.

Domestic use is possible and architecture can support the design.

It can be used to power ships, or yachts. Seeing as the device can collapse easily, is light weight, compact, it can be carried in a car or motorcycle, and recharge batteries anywhere sunny.

It's scalability, light weight, and compactness once deflated, could lend itself to be of use where other forms of renewable energy devices would not be practical.

It's adaptability to integrate it's function with different components at the focal point, makes it a a useful tool.

Due to it's light weight, it can possibly be used in space to collect energy, with a closed loop heat exchanging turbine at the focal point, to make and beam energy back to earth by laser or micro-wave, or it can possibly be used to detect electro-magnetic signals, or be used as a giant mirror lens in space, these with only a cable as centre.

Grids can be floated on water.

Grids of them can be hung from a suspended lattice of cables, and articulating from the bottom of the ballon that now only need a centre cable in place of a pole. May even be cheaper like this. Balloons can easily be changed or cleaned. Cleaning device can be appended to the mast, and pivot around to sweep the surface (not shown in drawings).

It can possibly be used in a weapon system.

Due to it's efficiency and cost effective factor, it would eliminate demand for many other expensive and dirty forms of methods used to produce energy. It can support transportation systems.

Can be deployed along railway and tram lines, as well as along highways to produce and store energy for charging batteries and vehicles.

It can be a tool to help under developed societies in southern remote regions; energy to establish a clean productive connected existence for them.

It will reduce global warming. It will change political power structure. It may start a revolution in re-usable energy production and more. A new tool in mankind's toolbox.

In essence, those big thermal solar energy collectors deployed today, that use grids of mirrors to focus the sun's rays on a common tower, are mimicking the effect a Parabola provides.

Apart from being more efficient than present solar thermal energy systems, balloon grids would be safer, as they would not blind pilots or burn birds that fly into the concentrated rays, as happens in the aforementioned devices in use.

All rays are deflected to the focal point located inside the envelope.

DRAWINGS

FIG. 1: This is the side view of a complete solar energy collecting system employing the use of my invention, the Pneumatic Parabolic Mirror.

This device, it's centre pole (3), now facing the sun at a High Noon position, swivels at the base, by ball and socket joint (6), and is articulated to face the vertex of the parabola, y-axis, toward the sun by adjusting cable tethers (7) attached to the mast (3).

There is a rigid ring (41) that is secured around the circumference of the mirror, that maintains the diameter. An air pump and release valve (9) to adjust balloon pressure is located on the lower flange (23) A servo-motor at the lower flange, adjusts the shape and focus of the mirror The sun tracking sensor (40) on top of the mast (3), signals a computer app to activate winches (not shown) that adjust the cables in three or four directions. The sun's rays pass through the upper transparent membrane (1), reflect off the inn lower membrane (2) to the coil heat exchanger (5) at the focal point.

Heat exchanging medium, oil or Ionic Salt is pumped (12) up the centre pole through a feed tube (16), heated in the coil (5) at the focal point, streamed down the extraction tube (17), to pass through the Kettle/Coil apparatus (18) where the heat is exchanged to water (26), that makes the steam (25) and pressure to outlet through a duct (19) to the steam turbine (20) to turn the electric generator (21).

The steam is condensed in heat sinking coil (14) below ground collected and pumped back to the system.

FIG. 2: This is the side view of a heat exchanger, as used in FIG. 1, that is a shaped coil( ) of tubing, encased in a heat absorbing material, that is suspended at the focal point on the centre pole or cable (3). A heat sensor on the extraction tube (17), signals a computer to speed up or slow the flow of fluid up the feed tube (16) that pass through the centre pole (3).

FIG. 3: This is the side view of a solar energy collecting system that employs my Pneumatic Parabolic Mirror invention, to power a Gas Turbine (38) supported at the focal point on the centre pole (3). It is in the High Noon position, facing the vertex of the mirror, y-axis perpendicular towards the sun. The mirror is articulated when the sensor (40) atop the mast (3), sends a signal to a computer app to adjust four cable (7) lengths by winches (not shown) that are anchored and attached to the mast (3).

The sun's rays pass through the clear top membrane (1) to reflect off inner lower surface (2) to the Gas Turbine (38) suspended at the focal on the centre pole( ). The Turbine (38) turns a crank shaft (39) the passes down the centre pole (3), to power electric generators (21) at the base of the structure, outside the balloon.

FIG. 4: This is the side view of a heat exchanger that can be incorporated into the centre pole (3) at the focal point. It is a water boiler to make steam (25). Water is pumped up the feed tube (11) when sensors indicate a need to refill. Water (26) boils, and Steam (25) is forced down the centre pole through a tube (44), through a flexible steam duct (19) to power a gas turbine (38), that is attached to an electric generator (21).

FIG. 5: This is a Pan and Tilt mechanism, that can be used to articulate the centre pole (3) and Mirror, instead of using the ball and joint/cable on mast method, that was previously described in drawing 1.

The servo-motors (30) that are computer driven, taking signals from the light sensor atop the mast (3). The servo-motors drive the pan gears (28) and tilt gears (29). The device swivels on a bearing (31) mounted on the anchoring beam (44). The tilt gear( ) is on a hinge( ) attached to the swivel base.

It is also shows a system where steam from a water boiler (4) at the focal point is transformed to electricity.

The steam is forced down the pipe (44) passing through the centre pole (3), then through a flexible duct (19) to the steam turbine (20) that powers an attached electric generator (21). The water is condensed and a pump (10) feeds the water back up the centre pole (3) to the boiler. FIG. 6: This is the way a Stirling engine can be incorporated into the centre pole (3) of a Pneumatic Parabolic Mirror device to turn electric generators (21) attached to the base of the centre pole (3).

The centre pole can act as a cylinder (42) for the hot and cold pistons (33), that are connected by a rod (43). The hot piston (not shown), is located at the focal point of the mirror. The expanding air that is pumped into the hot piston, forcing it down to force the push rods (35) to turn the fly wheels (37) and electric generators (21). The whole device is mounted on the ball and socket joint (6) and articulated using the tethered cable (7) winch method.

PARTS INDEX

1) Clear transparent membrane—top section of balloon mirror.

2) Reflective membrane—bottom section of balloon mirror
3) Centre pole/Mast—form holding and articulation structure for balloon mirror, as well as support for heat exchangers, PVCs
4) Boiler to exchange heat at focal point, to boil the contained water, to make steam.
5) Coil at focal point—heats liquid when streamed through—encased in heat absorbing mortar.
6) Ball and socket joint
7) Cable tethers articulate device in four directions SE-NE-SW-SE winched in and out by servo-motors.
8) Focus adjustment—gears and motor
9) Air pressure pump/release valve
10) Water pump
11) Water feed tube
12) Oil—Ionic Salt pump
13) Heat sensor
14) Heat sink condensing coil
15) Water level indicator
16) Feed tube for heat exchanging fluid
17) Extraction tube for heat exchanging fluid
18) Kettle/Coil device to make steam
19) Duct to channel steam to the turbine
20) Steam Turbine
21) Electric generator
22) Steam condenser
23) Flange to clamp and seal membranes
24) Fresnel lens
25) Steam
26) Condensed water
27) Tilt Hinge
28) Pan gears
29) Tilt gears
30) Servo-motor with gear transmission
31) Swivel bearing
32) Anchoring beam
33) Cold piston—Stirling engine
34) Compression Chamber
35) Push rods
36) Connecting rod to hot piston at focal point (not shown)
37) Fly wheel and cranks
38) Gas Turbine
39) Crank shaft
1240) Sun tracking sensor, to signal computer apps, to activate servo-motors
41) Rigid ring to stabilize diameter/shape of the mirror.
42) Piston cylinder
43) piston connecting rod
44) Steam Pipe

The invention claimed is:

1. A device for collecting solar energy, the device comprising:
a base;
an inflatable envelope having an upper portion that is transparent, and a lower portion that has an inner surface that reflects solar rays and focuses them in a region of the device; and
a pole that extends upwardly from the base through the lower portion of the envelope affixed thereto;
wherein the lower portion of the envelope is sealed around the pole;
wherein the pole is also affixed to the upper portion of the envelope;
wherein the pole extends through the upper portion of the device.

2. The device of claim 1 wherein the upper portion is sealed around the pole.

3. The device of claim 2 further comprising a resilient hoop between the upper and lower portions to radially support the envelope.

4. The device of claim 3 wherein the pole can pivot on the base to change an orientation of the device.

5. The device of claim 4 wherein the lower potion has generally a parabolic cross section.

6. The device of claim 5 wherein the upper portion is dome shaped.

7. The device of claim 6 wherein the pole is at a proximal radial centre of the envelope, passing through a focus region.

8. The device of claim 7 wherein the pole has a turbine mounted thereto.

9. The device of claim 8 wherein the pole comprises a shaft and wherein the turbine is configured to turn the shaft to power an electric generator at the base.

10. The device of claim 9 wherein the turbine is a gas turbine.

11. The device of claim 4 wherein the pole comprises a mast that extends above the upper portion of the envelope wherein the orientation of the device is adjusted by moving cables attached to the mast.

12. The device of claim 11 further comprising a sun tracking sensor to control the movement of the cables.

13. The device of claim 4 wherein the pole comprises a tube for pumping heat exchanging medium into the pole.

14. The device of claim 13 wherein the heat exchanging medium is heated inside the pole.

15. The device of claim 14 wherein the heated heat exchanging medium produces steam inside the pole.

16. The device of claim 15 wherein the pole comprises an outlet by which the steam is removed from the pole.

17. The device of claim 16 wherein the steam powers a generator.

18. The device of claim 17 wherein the heat exchanging medium is water, oil or ionic salt.

* * * * *